United States Patent
Mihocka

(10) Patent No.: US 10,261,785 B2
(45) Date of Patent: Apr. 16, 2019

(54) ARITHMETIC LAZY FLAGS REPRESENTATION FOR EMULATION

(71) Applicant: Microsoft Technology Licensing, LLC, Redmond, WA (US)

(72) Inventor: Darek Josip Mihocka, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 90 days.

(21) Appl. No.: 15/445,403

(22) Filed: Feb. 28, 2017

(65) Prior Publication Data

US 2018/0246719 A1    Aug. 30, 2018

(51) Int. Cl.
G06F 9/30    (2018.01)
G06F 9/455   (2018.01)

(52) U.S. Cl.
CPC ........ G06F 9/3001 (2013.01); G06F 9/30043 (2013.01); G06F 9/30094 (2013.01); G06F 9/30101 (2013.01); G06F 9/4552 (2013.01)

(58) Field of Classification Search
None
See application file for complete search history.

(56) References Cited

U.S. PATENT DOCUMENTS

| 7,065,750 | B2* | 6/2006 | Babaian | G06F 9/45504 717/136 |
| 7,200,841 | B2 | 4/2007 | Lovett et al. | |
| 7,331,040 | B2* | 2/2008 | Sandham | G06F 9/45537 717/136 |
| 7,536,682 | B2* | 5/2009 | Dankel | G06F 9/45516 712/209 |
| 7,752,028 | B2 | 7/2010 | Mihocka et al. | |

(Continued)

OTHER PUBLICATIONS

Mihocka, et al., "Virtualization Without Direct Execution or Jilting: Designing a Portable Virtual Machine Infrastructure", In Proceedings of the Workshop on Architectural and Microarchitectural Support for Binary Translation, Jun. 2008, 16 pages.

(Continued)

Primary Examiner — Corey S Faherty

(57) ABSTRACT

In aspects of arithmetic lazy flags representation for emulation, a host processor system receives application instructions that are designed for execution by a guest processor system that is different than a processor architecture of the host processor system. A host emulator receives an application instruction that includes an arithmetic operation, determines a result value of the arithmetic operation that is performed on integer values, and determines a first state variable and a second state variable. The host emulator also determines whether a subsequent application instruction will need a derivation of a subset of arithmetic flags based in part on a third state variable. The host emulator can then determine that the subsequent application instruction does not need the derivation of the subset of arithmetic flags, and perform the subsequent application instruction without a determination of the third state variable, thereby reducing processor clock cycles to emulate the application instructions.

20 Claims, 4 Drawing Sheets

(56) References Cited

U.S. PATENT DOCUMENTS

| | | | |
|---|---|---|---|
| 8,020,154 B2* | 9/2011 | Barraclough | G06F 9/30174 714/2 |
| 8,024,555 B2 | 9/2011 | Sandham et al. | |
| 9,015,026 B2* | 4/2015 | Poplack | G06F 17/5022 703/23 |
| 9,823,930 B2* | 11/2017 | Abdallah | G06F 9/30145 |
| 2004/0158822 A1 | 8/2004 | Sandham et al. | |
| 2008/0222388 A1 | 9/2008 | Mihocka | |

OTHER PUBLICATIONS

Mihocka, et al., "A Proposal for Hardware-Assisted Arithmetic Overflow Detection for Array and Bitfield Operations", In Proceedings of Workshop on Infrastructures for Software/Hardware Co-Design, Apr. 25, 2010, 6 pages.

Troger, et al., "Fast Microcode Interpretation with Transactional Commit/Abort", In Proceedings of 4th Workshop on Architectural and Microarchitectural Support for Binary Translation, Jun. 2011, 13 pages.

Cesare, Silvio, "Lazy EFlags evaluation and other emulator optimisations", https://silviocesare.wordpress.com/2009/03/08/lazy-eflags-evaluation-and-other-emulator-optimisations/, Published on: Mar. 8, 2009, 2 pages.

Mihocka, Darek, "The Arithmetic Flags Challenge", http://www.emulators.com/docs/nx11_flags.htm, Published on: Nov. 19, 2007, 14 pages.

Wei, et al., "TransARM: An Efficient Instruction Set Architecture Emulator", In Chinese Journal of Electronics, vol. 20, No. 1, Jan. 2011, pp. 6-10.

Andreas Erik Hindborg, "Accelerating Instruction Set Emulation using Reconfigurable Hardware and Trace Based Optimization", http://www2.imm.dtu.dk/pubdb/views/edoc_download.php/6689/pdf/imm6689.pdf, Published on: Aug. 2013, 122 pages.

Palaniswamy, et al., "An Efficient Implement at ion of Lazy Reevaluation", In Proceedings of the 25th annual symposium on Simulation. IEEE Computer Society Press, Apr. 6, 1992, pp. 140-146.

Wang, et al., "COREMU: A Scalable and Portable Parallel Full-system Emulator", In Proceedings of the 16th ACM SIGPLAN Symposium on Principles and Practice of Parallel Programming, Feb. 12, 2011, pp. 213-222.

Kenneth, et al., "An X86 emulator written using Java", In Doctoral dissertation of the University of Manchester, 2005, pp. 1-66.

Shwartsman, et al., "How Bochs Works Under the Hood", http://bochs.sourceforge.net/How%20the%20Bochs%20works%20under%20the%20hood%202nd%20edition.pdf, Published on: Jun. 2012, 22 pages.

"Qemu:—Main Page", http://wiki.qemu.org/Main_Page, Retrieved on: Nov. 17, 2016, 4 pages.

"International Search Report & Written Opinion Issued in PCT Application No. PCT/US2018/019073", dated Jun. 5, 2018, 13 Pages.

* cited by examiner

ARITHMETIC LAZY FLAGS REPRESENTATION FOR EMULATION

BACKGROUND

Computing devices rely on processors in order to run applications and execute other tasks. Application developers often design their applications to be run by a specific type of processor architecture. Because different computing devices often implement different processor architectures, problems arise when an application designed for one processor architecture is run by a computing device implementing another processor architecture. For example, a host computing device that implements an x86-based processor architecture would encounter problems when attempting to execute arithmetic instructions of a guest application or operating system, such as an application designed to be run by a processor architecture other than the host x86-based processor architecture. These problems arise because arithmetic flags in one processor architecture often do not map directly to arithmetic flags of a different processor architecture.

As a conventional solution, the host computing device uses an emulator that converts instructions of the guest application to x86-based instructions that can be run by the host processor architecture. However, emulator conversions require additional clock cycles to compute and thus introduce a slowdown when an application designed for a guest processor architecture is run on a host processor architecture. Conventional emulator techniques implement "lazy flags" to emulate arithmetic flags between different processor architectures. However, these conventional emulator techniques waste clock cycles by emulating arithmetic flags even when these arithmetic flags are not needed to properly execute the guest application. Because arithmetic flag emulations occur frequently when running an application, conventional emulation techniques cause unnecessary delay and detract from the intended performance of an emulated application.

SUMMARY

This Summary introduces features and concepts of arithmetic lazy flags representation for emulation, which is further described below in the Detailed Description and/or shown in the Figures. This Summary should not be considered to describe essential features of the claimed subject matter, nor used to determine or limit the scope of the claimed subject matter.

Arithmetic lazy flags representation for emulation is described. In aspects, a host system implementing a host processor architecture receives a set of instructions in order to boot and run an application or operating system that was designed for a guest processor architecture that is different from the host processor architecture, such that emulation is required for the system to perform the set of instructions. Each guest instruction in the set of instructions includes a first integer value, a second integer value, and an arithmetic operation that is to be performed on the first and second integer values. An emulator of the host system performs the arithmetic operation on the first and second integer values to generate an arithmetic result. Using the first integer value, the second integer value, and the arithmetic result, the host emulator determines a first state variable, a second state variable, and optionally a third state variable. The three state variables include information describing the results of performing the arithmetic operation and are useable by the host emulator to derive arithmetic flags describing a processor state after performing the arithmetic operation. Specifically, the third state variable is useable to derive a carry flag, an overflow flag, and an adjust flag of an x86-based processor system architecture.

The host emulator determines each of the first, second, and third state variables at the rate of one processor clock cycle per state variable. However, because guest instructions generally require infrequent derivation of the carry flag, the overflow flag, and the adjust flag, the host emulator would frequently waste valuable clock cycles if it determined each of the three state variables after performing each guest instruction. Accordingly, the techniques described herein determine whether a subsequent guest instruction in the set of multiple guest instructions require derivation of the carry flag, the overflow flag, or the adjust flag prior to determining the third state variable. If the host emulator determines that the subsequent guest instruction does not require derivation of these arithmetic flags, the host emulator proceeds to perform the subsequent guest instruction without first determining the third state variable, thereby reducing the amount of time required to emulate the guest instruction by one clock cycle. Thus, the arithmetic lazy flags representation techniques described herein significantly reduce the number of clock cycles needed to boot-up and run an emulated application, operating system, and the like.

BRIEF DESCRIPTION OF THE DRAWINGS

Aspects of arithmetic lazy flags representation for emulation are described with reference to the following Figures. Entities represented in the figures may be indicative of one or more entities and thus reference may be made interchangeably to single or plural forms of the entities in the discussion. The same numbers may be used throughout to reference like features and components that are shown in the Figures.

DETAILED DESCRIPTION

Figure 1:
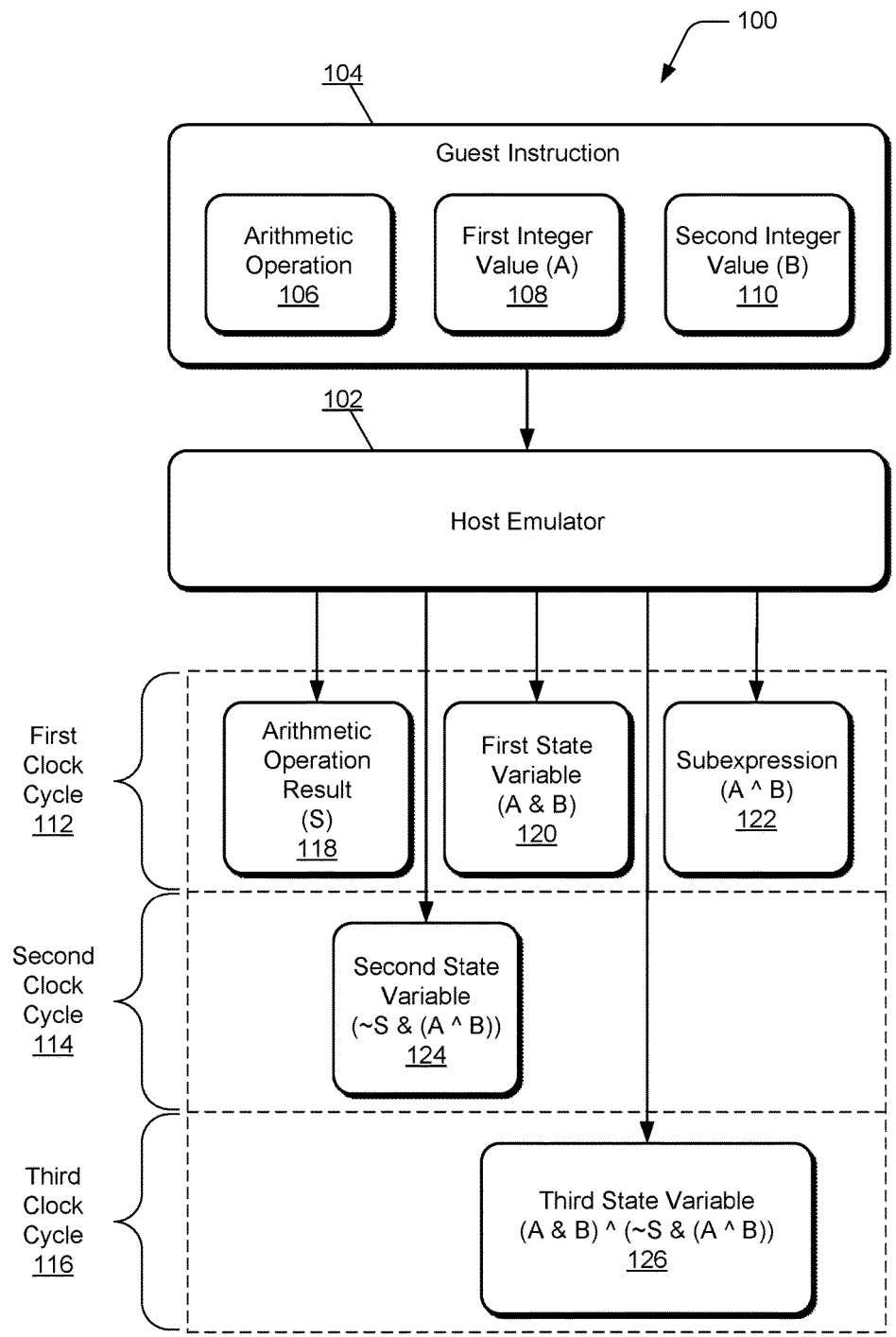
FIG. 1 illustrates an example system of arithmetic lazy flags representation for emulation in accordance with techniques described herein.

Aspects of arithmetic lazy flags representation for emulation are described for emulating arithmetic instructions that were designed for execution by one processor system architecture to be executed by a different processing system architecture, such that an application or operating system can be run by a processor system even if the application or operating system was not designed to be run by the processor system. As described herein, a processor system that performs the emulation is referred to as a "host processor system". Instructions that are received and emulated by the host processor system are referred to as "guest instructions", which are designed to be run on a guest processor system architecture that is different from an architecture of the host processor system.

In implementations, guest instructions require use of information stored in certain memory locations of a processor system. For example, when arithmetic operations for an application are performed by a computing device running the application, the computing device stores information that contains the results of performing the arithmetic operations. While the application is running, subsequent application instructions require use of this information containing results of the arithmetic operations in order for the subsequent application instructions to be properly executed. Thus, application instructions often require a computing device to query a specific memory location for use in performing certain instructions.

However, because different processor system architectures are designed differently, a memory location in a guest processor system does not necessarily have a direct counterpart to a memory location in a host processor system. For example, processor system architectures such as x86-based processor systems, Power-PC-based processor systems, advanced reduced instruction set computer machine (ARM)-based processor systems, and the like do not implement the same underlying architecture of memory locations. Due to cost concerns, source code for an application, an operating system, and so on is designed to run on one specific processor system architecture. The source code contains sequences of instructions that must be executed correctly by a processor system in order for an application, operating system, and the like to properly boot and run on the processor system. Because an application instruction designed for a guest processor system may require use of information stored in a memory location that does not exist in a host processor system, a device implementing the host processor system cannot run an application unless the application was specifically designed for the host processor system.

For example, in an x86-based processor system architecture, the processor system includes a flags register stored in memory. The flags register contains information describing the results of arithmetic operations performed by the processor system. In an x86-based processor system, flags are stored in individual bits of the flag register to characterize the results of arithmetic operations. For example, the flags register includes a "zero flag" in bit 6, a "sign flag" in bit 7, a "parity flag" in bit 2, a "carry flag" in bit 0, an "overflow flag" in bit 11, an "adjust flag" in bit 4, and so on. Thus, bits of the flag register in an x86-based processor system contain the current state of the processor system. Conversely, a Power-PC-based processor system architecture includes a condition register stored in memory to contain information describing the results of performed arithmetic operations. The condition register includes eight fields that are each a segment of four bits used to store status information about the results of an application or operating system instruction. Thus, the segments of the PowerPC condition register are not directly mappable to bits of the x86 flag register.

Continuing this example, instructions often designed for an x86-based application require use of information describing the results of previous arithmetic operations, which is stored in flags of the flags register. Conversely, instructions for a PowerPC-based application require use of information describing the results of previous arithmetic operations stored in bits of the condition register. Thus, a host x86-based processor system architecture emulating guest instructions for an application designed for a guest PowerPC-based processor system architecture needs to store information describing the results of executing arithmetic operations for use in performing subsequent guest instructions.

An example of generating and using a carry flag is performing an add without carry (ADD) instruction followed by an add with carry (ADC) instruction, such as when 32-bit code performs a 64-bit arithmetic as a 32-bit ADD, and propagates the carry flag to the upper 32-bit portion of the number using the ADC instruction. The ADD instruction generates all six of the x86-based processor flags, the ADC instruction consumes the carry flag, and then itself generates all six of the x86-based processor flags again. As noted above, the arithmetic flag set includes a zero flag, a sign flag, a parity flag, the carry flag, an overflow flag, and an adjust flag. Other examples of generating and using a carry flag include common "compare and branch sequences" that involve a compare (CMP) or subtraction (SUB) instruction followed by a conditional branch, such as JZ (Jump if Zero) or JNZ (Jump if Not Zero) or JC (Jump if Carry). In the case a CMP or SUB instruction followed by JZ, the optimization techniques described herein provide that the third state variable would not need to be calculated since the zero flag is the one consumed, not the carry flag. However, if JC is the instruction, then the third state variable would need to be calculated, but since JZ/JNZ instructions are much more common than JC/JNC instructions, the optimization technique saves a clock cycle when the instructions are JZ/JNZ instructions.

Using the techniques described herein, a host processor system emulates guest instructions of an application designed for a guest processor system using a host emulator. The host emulator emulates a guest instruction by performing an arithmetic operation specified by the guest instruction and recording information describing the results of the arithmetic operation in three different "state variables" stored in a lazy flag register within memory of the host processor system. Using these three different state variables, the host emulator can derive information describing the results of the arithmetic operation, such as deriving information that would be indicated by the zero flag, sign flag, parity flag, carry flag, overflow flag, and adjust flag of the x86-based flags register. Specifically, the techniques described herein store all information describing the results of an arithmetic operation in a first state variable and a second state variable of a lazy flag register on the host processor system. The third state variable of the flag register contains information that is useable to derive certain arithmetic flags resulting from performing an arithmetic operation, including the x86-based carry flag, overflow flag, and adjust flag.

A speed at which the host emulator determines the three state variables following execution of an arithmetic operation is governed by the speed of the host processing system, as the host emulator determines each of the three state variables at the rate of one clock cycle per state variable. Thus, it is advantageous to reduce the number of clock cycles used by the host emulator when emulating guest application instructions. Because subsequent application instructions do not always require derivation of a carry flag, an overflow flag, or an adjust flag in order for the subsequent application instructions to be properly executed, the host processor system would unnecessarily waste a clock cycle if it determined the third state variable after performing each application instruction in a set of multiple application instructions.

Because derivation of a carry flag, overflow flag, or an adjust flag during the execution of an application occurs much less frequently than derivation of other arithmetic flags such as the zero flag, sign flag, and parity flag, the techniques described herein refrain from determining the third state variable unless a subsequent application instruction requires derivation of a carry flag, overflow flag, or an adjust flag. Thus, the techniques described herein provide faster emulation of a guest application running on a host processor system.

While features and concepts of emulation using arithmetic lazy flags representation can be implemented in any number of different devices, systems, networks, environments, and/or configurations, aspects of arithmetic lazy flags representation for emulation are described in the context of the following example devices, systems, and methods.

FIG. 1 illustrates an example system 100 in which a host emulator 102 emulates a guest instruction 104 that was designed to be performed on a guest processor system architecture that is different from a host processor system architecture implementing the host emulator 102. As described herein, a guest instruction 104 includes an arithmetic operation 106 to be performed using a first integer value 108, which can be represented mathematically as "A", and a second integer value 110, which can be represented mathematically as "B". The arithmetic operation 106 can be any arithmetic operation that is performed in order to boot-up or run an application, operating system, and the like on a processor system.

For example, the arithmetic operation 106 can be an addition operation or a subtraction operation. The first and second integer values 108 and 110 can be values of any bit-length integer numbers, such as a 1-bit integer number, an 8-bit integer number, a 16-bit integer number, a 32-bit integer number, a 64-bit integer number, and so on. Furthermore, the first integer value 108 and the second integer value 110 can be a signed integer value or an unsigned integer value. As described herein, a signed integer value can include either positive or negative integer values. By contrast, an unsigned integer value can only include positive integer values.

The guest instruction 104 represents one instruction of a set of multiple instructions for an application or operating system that needs to be executed correctly in order for the application or operating system to boot-up and run properly. In implementations, a subsequent guest instruction received by the host emulator 102 may need to use information describing the results of performing the arithmetic operation 106 on the first integer value 108 and the second integer value 110. Accordingly, in addition to performing the arithmetic operation 106, the host emulator 102 is configured to determine three different state variables that contain information describing the results of the arithmetic operation 106 as performed using the first integer value 108 and the second integer value 110.

A rate at which the host emulator 102 can determine these three state variables is constrained by a processor clock speed of the host processor system implementing the host emulator 102. In implementations, the host emulator is configured to determine the three state variables at a rate of one clock cycle per state variable. These clock cycles are visually represented in the example system 100 by the first clock cycle 112, the second clock cycle 114, and the third clock cycle 116. During each of the three clock cycles 112, 114, and 116, the host emulator 102 is configured to determine various information that is useable to describe the results of performing the arithmetic operation 106.

For example, during the first clock cycle 112, the host emulator 102 performs the arithmetic operation 106 using the first integer value 108 and the second integer value 110 to determine an arithmetic operation result 118, a first state variable 120, and a subexpression 122. During the second clock cycle 114, the host emulator 102 determines the second state variable 124. Finally, during the third clock cycle, the host emulator 102 determines the third state variable 126. As is described in further detail below, determining the second state variable 124 requires knowledge of the arithmetic operation result 118 and the subexpression 122, such that determination of the second state variable 124 cannot be determined prior to determining the arithmetic operation result 118 and the subexpression 122. Similarly, determination of the third state variable 126 requires knowledge of the first state variable 120 and the second state variable 124, such that determination of the third state variable 126 cannot be determined prior to determining the second state variable 124. Upon determining the first state variable 120, the second state variable 124, and the third state variable 126, the host emulator 102 completes emulation of the arithmetic operation 106, with results of the arithmetic operation 106 resulting in the state variables 120, 124, and 126 in a manner that enables the host emulator 102 to derive arithmetic flags as needed, or "lazily".

To further illustrate how the host emulator 102 determines each of the state variables 120, 124, and 126, consider the following example where the host emulator 102 receives a guest instruction 104 that includes an arithmetic addition operation to be performed on a first integer value "A" and a second integer value "B". In this example, the host emulator 102 determines an arithmetic operation result 118, represented as "S", using Equation(1):

$$S=A+B$$

The host emulator 102 stores the arithmetic operation result 118 in memory of a computing device implementing the host emulator 102 for future retrieval. The host emulator 102 determines the first state variable 120 by performing a logical conjunction operation using the first integer value 108 and the second integer value 110, represented by Equation(2):

$$\text{First State Variable } 120 = (A\&B)$$

The host emulator 102 stores the first state variable 120 in the memory of the computing device implementing the host emulator for future retrieval. The host emulator 102 determines a subexpression 122 by performing a logical exclusive OR (XOR) operation using the first integer value 108 and the second integer value 110, represented by Equation (3):

$$\text{Subexpression } 122 = (A\hat{\ }B)$$

The host emulator 102 stores the subexpression 122 in the memory of the computing device implementing the host emulator 102 for future retrieval and for use in determining the second state variable 124. The host emulator 102 determines the arithmetic operation result 118, the first state variable 120, and the subexpression 122 during a single processor clock cycle, such as during the first clock cycle 112. After determining the arithmetic operation result 118, the first state variable 120, and the subexpression 122, the host emulator 102 determines the second state variable 124. The second state variable 124 is determined by performing a logical NOT operation applied to the arithmetic operation result 118 to produce a NOT value, which can be mathematically represented as "~S", and by performing a logical AND operation applied to the produced NOT value and the subexpression 122, represented by Equation(4):

$$\text{Second State Variable } 124 = (\sim S\&(A\hat{\ }B))$$

The host emulator 102 stores the second state variable 124 in the memory of the computing device implementing the host emulator 102 for future retrieval and for use in determining the third state variable 126. After determining the second state variable 124, the host emulator 102 determines the third state variable 126 by performing a logical XOR operation using the first state variable and the second state variable, represented by Equation(5):

Third State Variable 126=(A&B)^(~S&(A^B))

The host emulator 102 stores the third state variable 126 in the memory of the computing device implementing the host emulator 102 for future retrieval. Thus, after determining the first state variable 120, the second state variable 124, and the third state variable 126, the host emulator is able to lazily derive information describing a processor state after performing the guest instruction 104, such as deriving arithmetic flags that resulted from performing the arithmetic operation 106 using the first integer value 108 and the second integer value 110. For example, if the device implementing the host emulator 102 is an x86-based processor system, the host emulator 102 is able to lazily derive a zero flag, a sign flag, a parity flag, a carry flag, an overflow flag, and an adjust flag using the arithmetic operation result 118, the first state variable 120, the second state variable 124, and the third state variable 126.

The host emulator 102 can derive the zero flag, the sign flag, and the parity flag simply from the arithmetic operation result 118, mathematically represented as the "S". The host emulator 102 derives the zero flag by applying a logical equal-to operator to the arithmetic operation result 118 and a value of zero, which is represented by Equation(6):

Zero Flag=(S==0)

Thus, the host emulator 102 will derive that a zero flag has been set in response to the arithmetic operation result 118 being equal to zero. The host emulator 102 derives the sign flag by applying a logical less than operator to the arithmetic operation result and a value of zero, which is represented by Equation(7):

Sign Flag=(S<0)

Thus, the host emulator 102 will derive that a sign flag has been set in response to the arithmetic operation result 118 being of a value less than zero. The host emulator derives the parity flag by performing a table lookup to determine whether a number of set bits is odd or even in a binary representation of the arithmetic operation result 118, which is represented by Equation(8):

Parity Flag=(CountOfBits(S&255)&1==0)

In Equation 8, "S & 255" represents an index for use in performing the table lookup. Thus, because the zero flag, the sign flag, and the parity flag can be derived from the arithmetic operation result 118, the host emulator 102 stores the arithmetic operation result 118 and only derives the zero flag, sign flag, or parity flag as necessary to avoid unnecessary consumption of clock cycles needed to derive these arithmetic flags. In implementations, the host emulator 102 is configured to store the arithmetic operation result 118 by defining the arithmetic operation result 118 in memory as a sign-extended result "S" of performing the arithmetic operation 106 on the first integer value 108 and the second integer value 110.

In order to determine whether a carry flag, an overflow flag, or an adjust flag was set, the host emulator 102 derives the carry flag, the overflow flag, and the adjust flag from the third state variable 126. The host emulator 102 derives the carry flag from the third state variable by applying a logical less than sign to the third state variable 126 and a value of zero, which is represented by Equation(9):

Carry Flag=((A&B)^(~S&(A^B)))<0

Thus, the host emulator 102 will derive that a carry flag has been set in response to performing the guest instruction 104 if the third state variable 126 contains a value that is less than zero. The host emulator 102 derives the overflow flag using the third state variable by applying a left shift operator to the binary representation of the third state variable 126 that shifts the bits of the binary representation of the third state variable 126 to the left by one. The host emulator 102 then applies a logical XOR operator to the left-shifted third state variable bits and the third state variable 126, and applies a logical not-equal-to operation to a value of zero and the result of applying the logical XOR value to the left-shifted third state variable bits and the third state variable 126. Stated mathematically, the host emulator 102 derives the overflow flag using Equation(10):

Overflow Flag=(((A&B)^(~S&(A^B)))^((A&B)^(~S&(A^B)))<<1))!=0

Thus, the host emulator 102 derives that an overflow flag has been set in response to the portion of Equation(10) above contained in the outermost parentheses being not equal to zero. The host emulator 102 derives that an adjust flag has been set by applying a logical AND operation to the third state variable 126 and a value of eight (8), and applying a logical not-equal-to operation to the result of this logical AND operation and a value of zero. Stated mathematically, the host emulator 102 derives the adjust flag using Equation (11):

Adjust Flag=(((A&B)^(~S&(A^B)))&8)!=0

Thus, the host emulator 102 derives that an adjust flag has been set in response to the portion of Equation(11) contained in the outermost parentheses being not equal to zero.

Accordingly, the arithmetic lazy flags representation techniques described herein enable the host emulator 102 to easily derive arithmetic flags on demand, or "lazily" when the host emulator 102 performs a guest instruction 104 that requires use of one or more of the arithmetic flags. Thus, the host emulator 102 avoids unnecessarily wasting processor clock cycles by not deriving arithmetic flags unless needed.

The host emulator 102 is configured to further avoid wasting unnecessary processor clock cycles by selectively determining the third state variable 126. Specifically, the host emulator 102 determines whether a subsequent guest instruction following the guest instruction 104 requires use of the carry flag, the overflow flag, or the adjust flag in order to properly emulate the subsequent guest instruction. When the host emulator 102 determines that the subsequent guest operation does not require derivation of the carry flag, the overflow flag, or the adjust flag, the host emulator 102 performs the subsequent guest operation without determining the third state variable. Because the majority of application and operating system instructions that require derivation of arithmetic flags use arithmetic flags other than the carry flag, the overflow flag, and the adjust flag, the techniques described herein eliminate use of clock cycles that would otherwise be wasted in determining the third state variable.

Thus, in the example system 100 of FIG. 1, the host emulator 102 determines the first state variable 120 during the first clock cycle 112, determines the second state variable 124 during the second clock cycle 114, and can refrain from determining the third state variable 126 unless it determines that a guest instruction to be performed following the guest instruction 104 requires use of a carry flag, an overflow flag, or an adjust flag. Accordingly, using the techniques described herein, the host emulator 102 determines the third state variable 126 only when needed. When the third state variable 126 is not needed to perform a guest instruction subsequent to the guest instruction 104, the host emulator 102 is able to emulate the guest instruction 104 using only the first clock cycle 112 and the second clock cycle 114, thereby avoiding unnecessary consumption of clock cycles during emulation of an application or operating system.

Thus, the techniques described herein enable emulation of guest instructions that were designed for a guest processor system architecture on a different, host system architecture in a manner that uses fewer clock cycles than conventional emulation techniques, by selectively determining a third state variable that stores information describing the result of an arithmetic operation during emulation.

Figure 2:
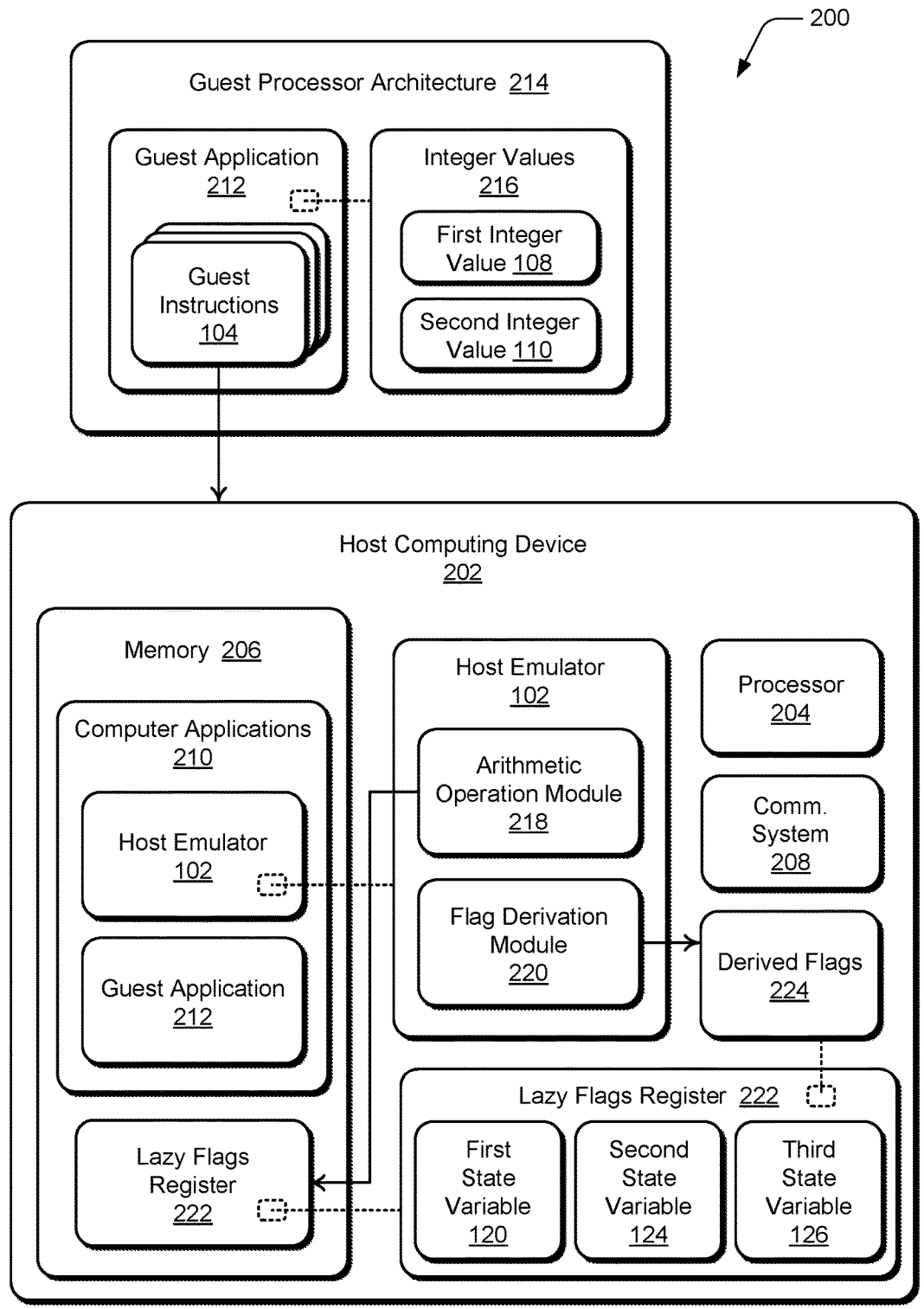
FIG. 2 illustrates an example system in which aspects of arithmetic lazy flags representation for emulation can be implemented.

FIG. 2 illustrates an example system 200 in which embodiments of arithmetic lazy flags representation for emulation can be implemented. The example system 200 includes a host computing device 202, such as a host computing device that determines the first state variable 120, determines the second state variable 124, and selectively determines the third state variable 126 using the techniques shown and described with reference to FIG. 1. The host computing device 202 can be implemented with various components, such as a processor 204 (or processing system) and memory 206, as well as with any number and combination of different components as further described with reference to the example device shown in FIG. 4.

The processor 204 (or processing system) corresponds to a host processor system architecture, such as the host processor system architecture described with reference to FIG. 1. Although not illustrated, the host computing device 202 may be implemented as a mobile or portable device and can include a power source, such as a battery, to power the various device components. Further, the host computing device 202 can include a communication system 208 that includes a radio device, antenna, and chipset that is implemented for wireless communication with other devices, networks, and services.

As described herein, the techniques for arithmetic lazy flags representation for emulation of guest instructions on the host computing device 202 enable the host computing device 202 to boot-up and run applications, operating systems, and the like that are designed for a guest processor system architecture that is different from the a processor system architecture of the processor 204. The disclosed techniques include performing an arithmetic operation and storing results of the arithmetic operation by determining a first state variable, determining a second state variable, and selectively determining a third state variable that are useable to derive arithmetic flags if a subsequent guest instruction requires use of an arithmetic flag. The host computing device 202 includes one or more computer applications 210, such as the guest application 212 and the host emulator 102 that is configured to emulate guest instructions 104 of the guest application 212 so that the guest application 212 can boot-up and run on the host computing device 202.

In implementations, the guest application 212 is designed for execution by the guest processor architecture 214, where the guest processor architecture 214 is a fundamentally different processor system architecture than that of the processor 204 implemented by the host computing device 202. For instance, the processor 204 may be an x86-based processor and the guest processor architecture 214 may be a different processor system architecture, such as a PowerPC-based processor system, an ARM-based processor system, and so on. Alternatively, the guest processor architecture 214 may be an x86-based processor system and the processor 204 may be a different processor system architecture, such as a PowerPC-based processor system, an ARM-based processor system, and so on.

In order for the guest application 212 to boot-up and run properly, the guest application 212 includes multiple guest instructions 104 that need to be executed correctly by a computing device implementing the guest application 212. In implementations, each of the guest instructions 104 include an arithmetic operation to be performed on integer values 216 specified by the guest application 212. For example, in accordance with one or more implementations, one of the guest instructions 104 specifies an arithmetic operation to be performed using the first integer value 108 and the second integer value 110, as described above with respect to FIG. 1.

Continuing this example, because a subsequent one of the guest instructions 104 may require use of arithmetic results from performing the previous guest instruction in order to execute properly, the host computing device 202 executing the guest application 212 needs to store information describing the results of performed arithmetic operations. For example, a subsequent guest instruction 104 may instruct the host computing device running the guest application 212 to access a status register of the guest processor architecture 214 to perform the subsequent guest instruction. However, because the status register does not exist in the processor 204, problems can arise when the host computing device 202 is executing the guest application 212. In order to address these register access problems, the host computing device 202 implements a host emulator 102 that is configured to perform the arithmetic operations specified by the guest instructions 104 and to store information regarding the results of these arithmetic operations so that subsequent guest instructions 104 can be properly emulated.

The host emulator 102 is implemented to receive the guest instructions 104 and the associated integer values 216 from the guest application 212, and to execute the guest instructions 104 using the arithmetic lazy flags representation techniques described herein. The host emulator 102 includes an arithmetic operation module 218 that is implemented to perform arithmetic operations specified by the guest instructions 104 using the integer values 216 provided by the guest application 212, such as the first integer value 108 and the second integer value 110. The arithmetic operation module 218 is additionally implemented to determine information describing the results of performed arithmetic operations and store this determined information in the lazy flags register 222. In implementations, the arithmetic operation module 218 determines the first state variable 120, determines the second state variable 124, and selectively determines the third state variable 126, as described above with respect to FIG. 1.

The host emulator 102 in the host computing device 202 additionally includes a flag derivation module 220 that is implemented to derive arithmetic flags 224 from results of arithmetic operations performed by the arithmetic operation module 218 and information stored in the lazy flags register 222, such as from information stored as the first state variable 120, the second state variable 124, and the third state variable 126. The derived arithmetic flags 224 can include a zero flag, a sign flag, a parity flag, a carry flag, an overflow flag, and an adjust flag as specified by an x86-based processor architecture. Thus, the flag derivation module 220 is implemented to derive the arithmetic flags 224 using the techniques described above with respect to FIG. 1.

The host emulator 102, as well as the arithmetic operation module 218 and the flag derivation module 220, can each be implemented as a software application or module, such as computer-executable software instructions that are executable with the processor 204 (or with a processing system) to implement the arithmetic lazy flags representation techniques describe herein. The host emulator 102, along with the arithmetic operation module 218 and the flag derivation module 220, can be stored on computer-readable storage memory (e.g., the device memory 206), such as any suitable memory device or electronic data storage implemented in the computing device. Although shown as components of a single host emulator 102, the arithmetic operation module 218 and the flag derivation module 220 may be implemented as separate modules, components, or software applications.

In implementations, the host emulator 102 receives the guest instructions 104 in order to execute the guest application 212, that is otherwise designed for the guest processor architecture 214, on the host computing device 202 that implements the processor 204 having a different processor system architecture than the guest processor architecture 214. The host emulator 102 includes the arithmetic operation module 218 that performs the arithmetic operations specified by the guest instructions 104 using the integer values 216, such as the first integer value 108 and the second integer value 110. In addition to storing a result of the performed arithmetic operation, the arithmetic operation module 218 stores information describing results of the performed arithmetic operation in the lazy flags register 222 using the first state variable 120, the second state variable 124, and the third state variable 126.

Because individual processor clock cycles are needed to determine each of the state variables 120, 124, and 126, the arithmetic operation module 218 is implemented to selectively determine the third state variable 126, such that the third state variable 126 is only determined when a subsequent guest instruction 104 requires derivation of a carry flag, an overflow flag, and/or an adjust flag in order to be properly executed. The subset of arithmetic flags includes the carry flag, the overflow flag, and the adjust flag from the overall set of the six arithmetic flags 224, those being the zero flag, the sign flag, the parity flag, the carry flag, the overflow flag, and the adjust flag. The host emulator 102 additionally includes the flag derivation module 220 that is implemented to derive the arithmetic flags 224 from the state variables in the lazy flags register 222 only when needed. Thus, the host emulator 102 eliminates use of unnecessary clock cycles and increases a speed at which the guest application 212 can be emulated on the host computing device 202.

Example method 300 is described with reference to FIG. 3 in accordance with one or more aspects of arithmetic lazy flags representation for emulation. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
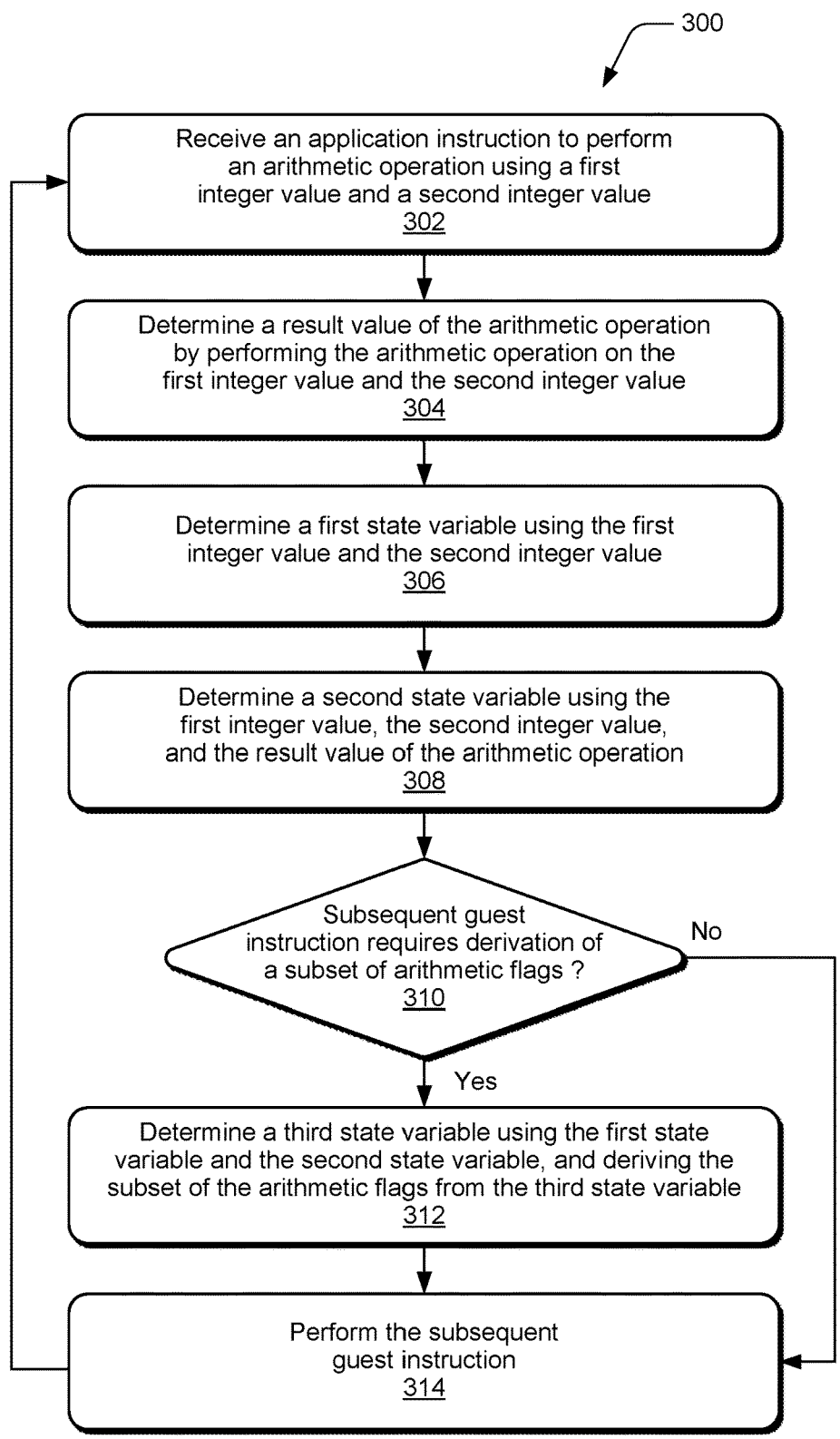
FIG. 3 illustrates an example method of arithmetic lazy flags representation for emulation in accordance with techniques described herein.

FIG. 3 illustrates an example method 300 of instruction emulation using the arithmetic lazy flags representation techniques discussed herein, and is generally described with reference to FIGS. 1 and 2. The order in which the method is described is not intended to be construed as a limitation, and any number or combination of the method operations can be performed in any order to implement a method, or an alternate method.

At 302, an application instruction is received, where the application instruction includes an arithmetic operation to be performed using a first integer value and a second integer value. For example, the host emulator 102 that is implemented on the host computing device 202 receives a guest instruction 104 that specifies an arithmetic add or subtract operation to be performed using the integer values 216, such as the first integer value 108 and the second integer value 110. Each integer value corresponds to a binary representation of an integer value, which can be expressed in any length of bits. The guest instruction 104 and the integer values 216 may be received from a guest application 212 that is being executed by the host computing device 202, where the guest instruction 104 is designed for execution by a guest processor architecture 214 that is different from a processor 204 of the host computing device 202.

At 304, a result value of the arithmetic operation is determined by performing the arithmetic operation on the first integer value and the second integer value. For example the arithmetic operation module 218 performs the arithmetic operation 106 using the first integer value 108 and the second integer value 110 to produce the arithmetic operation result 118. This arithmetic operation result 118 can be stored in memory of a computing device that implements the arithmetic operation module 218 for later use and retrieval, such as in the memory 206 of the host computing device 202. Because performance of subsequent guest instructions 104 may require use of information describing the results of performing the arithmetic operation, the arithmetic operation module 218 determines various state variables in which information describing the results of the arithmetic operation are stored on the host computing device 202.

At 306, a first state variable is determined using the first integer value and the second integer value. For example, the arithmetic operation module 218 determines the first state variable 120 by performing a logical AND operation using the first integer value 108 and the second integer value 110. The first state variable 120 is then stored in memory of a computing device implementing the arithmetic operation module 218. For example, the first state variable 120 is stored in the lazy flags register 222 within the memory 206 of the host computing device 202.

At 308, a second state variable is determined using the first integer value, the second integer value, and the result value of the arithmetic operation. For example, the arithmetic operation module 218 determines the second state variable 124 by applying a logical NOT operator to the arithmetic operation result 118 to produce a NOT value, by applying a logical XOR operation to the first integer value 108 and the second integer value 110 to produce an XOR value, which is represented as subexpression 122, and by applying a logical AND operation to the produced NOT value and the subexpression 122. The second state variable 124 is then stored in memory of a computing device implementing the arithmetic operation module 218. For example, the second state variable 124 is stored in the lazy flags register 222 within the memory 206 of the host computing device 202.

At 310, a determination is made as to whether a subsequent guest instruction requires derivation of a subset of arithmetic flags. For example, the host emulator 102 determines whether a subsequent guest instruction 104 that is received after the guest instruction 104 will require derivation of a carry flag, an overflow flag, and/or an adjust flag in order for the subsequent guest instruction to be properly executed. The host emulator 102 performs this determination prior to determining the third state variable 126 in order to reduce the number of processor clock cycles that are needed to emulate the guest instructions 104. The subset of arithmetic flags includes the carry flag, the overflow flag, and the adjust flag from the overall arithmetic flag set of the six flags, those being the zero flag, the sign flag, the parity flag, the carry flag, the overflow flag, and the adjust flag.

If the subsequent guest instruction will require derivation of the subset of arithmetic flags (i.e., "Yes" from 310), then at 312, a third state variable is determined using the first state variable and the second state variable, and the subset of arithmetic flags is derived from the third state variable. For example, the arithmetic operation module 218 determines the third state variable 126 by applying a logical XOR operation to the first state variable 120 and the second state variable 124. The third state variable 126 is then stored in memory of a computing device implementing the arithmetic operation module 218. For example, the third state variable 126 is stored in the lazy flags register 222 within the memory 206 of the host computing device 202. The flag derivation module 220 then derives the arithmetic flag 224 from the third state variable 126 stored in the lazy flags register 222.

In implementations, the flag derivation module 220 derives an arithmetic carry flag using Equation(9) described herein; derives an arithmetic overflow flag using Equation (10) described herein; and derives an arithmetic adjust flag using Equation(11) described herein. The derived arithmetic flags 224 are then stored in computing device memory so that the derived flags can be used to execute the subsequent guest instruction 104 properly on the host computing device 202. For example, the derived arithmetic flags 224 are stored in the lazy flags register 222 within the memory 206 of the host computing device 202. However, if it is determined at 310 that the subsequent guest instruction does not require derivation of the subset of the arithmetic flags (e.g., the lazy flags) (i.e., "No" from 310), then the third state variable is not determined and the subset of arithmetic flags are not derived, thereby avoiding wasting processor clock cycles that would otherwise be required to determine the third state variable and derive the subset of arithmetic flags (i.e., the carry flag, the overflow flag, and the adjust flag).

At 314, the subsequent guest instruction is performed. For example, the subsequent guest instruction is another guest instruction 104 that is received by the host emulator 102 after receiving the guest instruction 104. The method 300 can continue at 302 and the host emulator 102 performs the guest instructions 104 in a similar manner as described above with respect to method blocks 304-312. Thus, the techniques described herein are implemented to continue performing the guest instructions 104 for the guest application 212 or processor system, even if the guest application or processor system is not designed to be executed by a processor system of the host computing device 202 that implements the host emulator 102.

Figure 4:
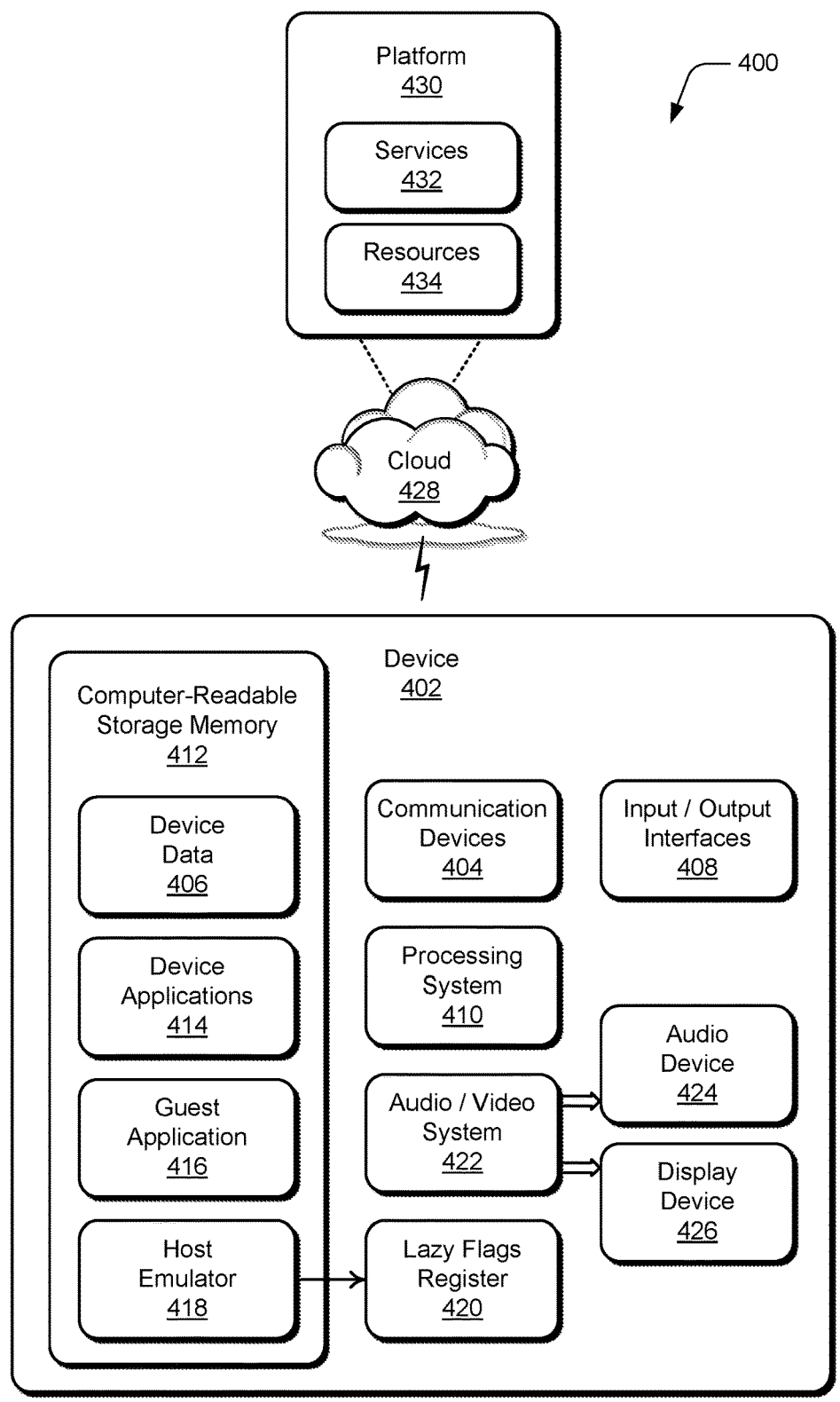
FIG. 4 illustrates an example system with an example device that can implement arithmetic lazy flags representation for emulation as described herein.

FIG. 4 illustrates an example system 400 that includes an example device 402, which can implement arithmetic lazy flags representation for emulation using the techniques described herein. The example device 402 can be implemented as any of the computing devices and/or server devices described with reference to the previous FIGS. 1-3, such as any type of mobile device, client device, mobile phone, tablet, computing, communication, entertainment, gaming, media playback, and/or other type of device. For example, the host computing device 202 described herein may be implemented as the example device 402 or with various components of the example device.

The device 402 includes communication devices 404 that enable wired and/or wireless communication of device data 406, such as integer values used in the execution of guest instructions. Additionally, the device data 406 can include any type of audio, video, and/or image data. The communication devices 404 can also include transceivers for cellular phone communication and for network data communication.

The device 402 also includes input/output (I/O) interfaces 408, such as data network interfaces that provide connection and/or communication links between the device, data networks, and other devices described herein. The I/O interfaces can be used to couple the device to any type of components, peripherals, and/or accessory devices. For example, the I/O interfaces can be used to couple the device to a guest computing device from which the guest application is received. The I/O interfaces also include data input ports via which any type of data, media content, and/or inputs can be received, such as user inputs to the device, as well as any type of audio, video, and/or image data received from any content and/or data source.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The device 402 also includes a computer-readable storage memory 412, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 412 provides storage of the device data 406 and various device applications 414, such as an operating system that is maintained as a software application with the computer-readable storage memory and executed by the processing system 410. In this example, the device applications include a guest application 416 that is designed to be run on a processor architecture that is different from a processor architecture of the processing system 410. Additionally, the device applications include a host emulator 418 that implements embodiments of the arithmetic lazy flags representation techniques described herein with reference to FIGS. 1-3, and is useable to generate a lazy flags register 420, which can also be stored in the computer-readable storage memory 412. An example implementation of the host emulator 418 is the host emulator 102 that is shown and described with reference to FIGS. 1 and 2.

The device 402 also includes an audio and/or video system 422 that generates audio data for an audio device 424 and/or generates display data for a display device 426. The audio device and/or the display device include any devices that process, display, and/or otherwise render audio, video, display, and/or image data. In implementations, the audio device and/or the display device are integrated components of the example device 402. Alternatively, the audio device and/or the display device are external, peripheral components to the example device.

In aspects, at least part of the arithmetic lazy flags representation for emulation techniques may be implemented in a distributed system, such as over a "cloud" 428 in a platform 430. The cloud 428 includes and/or is representative of the platform 430 for services 432 and/or resources 434. The platform 430 abstracts underlying functionality of hardware, such as server devices (e.g., included in the services 432) and/or software resources (e.g., included as the resources 434), and connects the example device 402 with other devices, servers, etc. The resources 434 may also include applications and/or data that can be utilized while computer processing is executed on servers that are remote from the example device 402. Additionally, the services 432 and/or the resources 434 may facilitate subscriber network services, such as over the Internet, a cellular network, or Wi-Fi network. The platform 430 may also serve to abstract and scale resources to service a demand for the resources 434 that are implemented via the platform, such as in an interconnected device embodiment with functionality distributed throughout the system 400. For example, the functionality may be implemented in part at the example device 402 as well as via the platform 430 that abstracts the functionality of the cloud.

Although aspects of arithmetic lazy flags representation for emulation have been described in language specific to features and/or methods, the appended claims are not necessarily limited to the specific features or methods described. Rather, the specific features and methods are disclosed as example implementations of arithmetic lazy flags representation for emulation, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following:

A computing system implemented for instruction emulation, the system comprising: a memory configured to maintain multiple instructions for an application that is designed for execution by a guest processor system; and a host processor system that is different than the guest processor system, the host processor system implementing a host emulator configured to: receive one of the multiple instructions having an arithmetic operation to be performed using a first integer value and a second integer value; determine a result value of the arithmetic operation performed on the first integer value and the second integer value; determine a first state variable and a second state variable; determine whether a subsequent instruction will need a derivation of a subset of arithmetic flags based in part on a third state variable; and responsive to the determination that the subsequent instruction does not need the derivation of the subset of arithmetic flags, perform the subsequent instruction without a determination of the third state variable.

Alternatively or in addition to the above described computing system, any one or combination of: the arithmetic operation is an add operation or a subtract operation to be performed using the first integer value and the second integer value. The host emulator is configured to: determine the first state variable using the first integer value and the second integer value; and determine the second state variable using the result value of the arithmetic operation, the first integer value, and the second integer value. The host emulator is further configured to, responsive to the determination that the subsequent instruction does need the derivation of the subset of arithmetic flags: determine the third state variable using the first state variable and the second state variable; derive the subset of arithmetic flags based at least in part on the third state variable; and perform the subsequent instruction using the subset of arithmetic flags. The host processor system comprises an x86-based system and the guest processor system comprises one of a Power-PC-based system or an advanced reduced instruction set computer machine (ARM)-based system. The first integer value is one of a signed integer value or an unsigned integer value, and the second integer value is one of a signed integer value or an unsigned integer value. The subset of arithmetic flags comprises a carry flag, an overflow flag, and an adjust flag from an arithmetic flag set comprising a zero flag, a sign flag, a parity flag, the carry flag, the overflow flag, and the adjust flag. The host emulator is configured to store at least the first state variable and the second state variable in a lazy flags register in the memory. The application comprises an operating system for a computing device and the multiple instructions are of the operating system designed for the execution by the guest processor system.

A method for instruction emulation, the method comprising: receiving, at a host processor system, an application instruction for an application designed for execution by a guest processor system that is different than the host processor system, the application instruction including an arithmetic operation to be performed using a first integer value and a second integer value; determining a result value by performing the arithmetic operation on the first integer value and the second integer value; determining a first state variable and a second state variable; determining whether a subsequent application instruction will need a derivation of a subset of arithmetic flags based in part on a third state variable; and responsive to the determining that the subsequent application instruction does not need the derivation of the subset of arithmetic flags, performing the subsequent application instruction without determining the third state variable.

Alternatively or in addition to the above described method, any one or combination of: the subset of arithmetic flags comprises a carry flag, an overflow flag, and an adjust flag from an arithmetic flag set comprising a zero flag, a sign flag, a parity flag, the carry flag, the overflow flag, and the adjust flag. The arithmetic operation comprises an add operation or a subtract operation performed using the first integer value and the second integer value. Further comprising, determining the first state variable using the first integer value and the second integer value; and determining the second state variable using the result value of the arithmetic operation, the first integer value, and the second integer value. Responsive to the determining that the subsequent application instruction does need the derivation of the subset of arithmetic flags, the method further comprising: determining the third state variable using the first state variable and the second state variable; deriving the subset of arithmetic flags based at least in part on the third state variable; and performing the subsequent application instruction using the subset of arithmetic flags. The host processor system comprises an x86-based system and the guest processor system comprises one of a Power-PC-based system or an advanced reduced instruction set computer machine (ARM)-based system. Further comprising storing at least the first state variable and the second state variable in a lazy flags register in memory of a computing device that implements the host processor system and a host emulator of the application.

A computer-readable storage memory comprising stored instructions that are executable and, responsive to execution of the stored instructions by a computing system, the computing system implements a host emulator that performs operations comprising to: receive an application instruction for an application designed for execution by a guest processor system that is different than a host processor system of the computing system, the application instruction including an arithmetic operation to be performed using a first integer value and a second integer value; determine a result value by the arithmetic operation being performed on the first integer value and the second integer value; determine a first state variable using the first integer value and the second integer value; determine a second state variable using the result value of the arithmetic operation, the first integer value, and the second integer value; determine whether a subsequent application instruction will need a derivation of a subset of arithmetic flags based in part on a third state variable; and responsive to the determination that the subsequent application instruction does not need the derivation of the subset of arithmetic flags, perform the subsequent application instruction without a determination of the third state variable.

Alternatively or in addition to the above described computer-readable storage memory, any one or combination of: the host emulator further performs the operations comprising to perform the arithmetic operation as an add operation or a subtract operation using the first integer value and the second integer value. The host emulator further performs the operations comprising to, responsive to the determination that the subsequent application instruction does need the derivation of the subset of arithmetic flags: determine the third state variable using the first state variable and the second state variable; derive the subset of arithmetic flags based at least in part on the third state variable; and perform the subsequent application instruction using the subset of arithmetic flags. The host emulator further performs the operations comprising to store at least the first state variable and the second state variable in a lazy flags register in memory.

The invention claimed is:

1. A computing system implemented for instruction emulation, the system comprising:

a memory configured to maintain multiple instructions for an application that is designed for execution by a guest processor system; and a host processor system that is different than the guest processor system, the host processor system implementing a host emulator configured to:

receive one of the multiple instructions having an arithmetic operation to be performed using a first integer value and a second integer value;

determine a result value of the arithmetic operation performed on the first integer value and the second integer value;

determine a first state variable and a second state variable;

determine whether a subsequent instruction will need a derivation of a subset of arithmetic flags based in part on a third state variable; and responsive to the determination that the subsequent instruction does not need the derivation of the subset of arithmetic flags, perform the subsequent instruction without a determination of the third state variable.

2. The computing system as recited in claim 1, wherein the arithmetic operation is an add operation or a subtract operation to be performed using the first integer value and the second integer value.

3. The computing system as recited in claim 1, wherein the host emulator is configured to:

determine the first state variable using the first integer value and the second integer value; and determine the second state variable using the result value of the arithmetic operation, the first integer value, and the second integer value.

4. The computing system as recited in claim 1, wherein the host emulator is further configured to, responsive to the determination that the subsequent instruction does need the derivation of the subset of arithmetic flags:

determine the third state variable using the first state variable and the second state variable;

derive the subset of arithmetic flags based at least in part on the third state variable; and perform the subsequent instruction using the subset of arithmetic flags.

5. The computing system as recited in claim 1, wherein the host processor system comprises an x86-based system and the guest processor system comprises one of a Power-PC-based system or an advanced reduced instruction set computer machine (ARM)-based system.

6. The computing system as recited in claim 1, wherein the first integer value is one of a signed integer value or an unsigned integer value, and the second integer value is one of a signed integer value or an unsigned integer value.

7. The computing system as recited in claim 1, wherein the subset of arithmetic flags comprises a carry flag, an overflow flag, and an adjust flag from an arithmetic flag set comprising a zero flag, a sign flag, a parity flag, the carry flag, the overflow flag, and the adjust flag.

8. The computing system as recited in claim 1, wherein the host emulator is configured to store at least the first state variable and the second state variable in a lazy flags register in the memory.

9. The computing system as recited in claim 1, wherein the application comprises an operating system for a computing device and the multiple instructions are of the operating system designed for the execution by the guest processor system.

10. A method for instruction emulation, the method comprising:
- receiving, at a host processor system, an application instruction for an application designed for execution by a guest processor system that is different than the host processor system, the application instruction including an arithmetic operation to be performed using a first integer value and a second integer value;
- determining a result value by performing the arithmetic operation on the first integer value and the second integer value;
- determining a first state variable and a second state variable;
- determining whether a subsequent application instruction will need a derivation of a subset of arithmetic flags based in part on a third state variable; and
- responsive to the determining that the subsequent application instruction does not need the derivation of the subset of arithmetic flags, performing the subsequent application instruction without determining the third state variable.

11. The method as recited in claim 10, wherein the subset of arithmetic flags comprises a carry flag, an overflow flag, and an adjust flag from an arithmetic flag set comprising a zero flag, a sign flag, a parity flag, the carry flag, the overflow flag, and the adjust flag.

12. The method as recited in claim 10, wherein the arithmetic operation comprises an add operation or a subtract operation performed using the first integer value and the second integer value.

13. The method as recited in claim 10, further comprising:
- determining the first state variable using the first integer value and the second integer value; and
- determining the second state variable using the result value of the arithmetic operation, the first integer value, and the second integer value.

14. The method as recited in claim 10, wherein responsive to the determining that the subsequent application instruction does need the derivation of the subset of arithmetic flags, the method further comprising:
- determining the third state variable using the first state variable and the second state variable;
- deriving the subset of arithmetic flags based at least in part on the third state variable; and
- performing the subsequent application instruction using the subset of arithmetic flags.

15. The method as recited in claim 10, wherein the host processor system comprises an x86-based system and the guest processor system comprises one of a Power-PC-based system or an advanced reduced instruction set computer machine (ARM)-based system.

16. The method as recited in claim 10, further comprising storing at least the first state variable and the second state variable in a lazy flags register in memory of a computing device that implements the host processor system and a host emulator of the application.

17. A computer-readable storage memory comprising stored instructions that are executable and, responsive to execution of the stored instructions by a computing system, the computing system implements a host emulator that performs operations comprising to:
- receive an application instruction for an application designed for execution by a guest processor system that is different than a host processor system of the computing system, the application instruction including an arithmetic operation to be performed using a first integer value and a second integer value;
- determine a result value by the arithmetic operation being performed on the first integer value and the second integer value;
- determine a first state variable using the first integer value and the second integer value;
- determine a second state variable using the result value of the arithmetic operation, the first integer value, and the second integer value;
- determine whether a subsequent application instruction will need a derivation of a subset of arithmetic flags based in part on a third state variable; and
- responsive to the determination that the subsequent application instruction does not need the derivation of the subset of arithmetic flags, perform the subsequent application instruction without a determination of the third state variable.

18. The computer-readable storage memory as recited in claim 17, wherein the host emulator further performs the operations comprising to perform the arithmetic operation as an add operation or a subtract operation using the first integer value and the second integer value.

19. The computer-readable storage memory as recited in claim 17, wherein the host emulator further performs the operations comprising to, responsive to the determination that the subsequent application instruction does need the derivation of the subset of arithmetic flags:
- determine the third state variable using the first state variable and the second state variable;
- derive the subset of arithmetic flags based at least in part on the third state variable; and
- perform the subsequent application instruction using the subset of arithmetic flags.

20. The computer-readable storage memory as recited in claim 17, wherein the host emulator further performs the operations comprising to store at least the first state variable and the second state variable in a lazy flags register in memory.

* * * * *